United States Patent [19]
Ogata et al.

[11] Patent Number: 5,721,994
[45] Date of Patent: Feb. 24, 1998

[54] PHOTOGRAPHING APPARATUS FOR RECORDING DATA ON FILMS

[75] Inventors: Yasuzi Ogata, Akigawa; Yuji Miyauchi, Koganei, both of Japan

[73] Assignee: Olympus Optical Co., Ltd., Tokyo, Japan

[21] Appl. No.: 421,970

[22] Filed: Apr. 14, 1995

[30] Foreign Application Priority Data

Apr. 15, 1994 [JP] Japan .................................. 6-101545
Apr. 26, 1994 [JP] Japan .................................. 6-109114

[51] Int. Cl.$^6$ ........................... G03B 17/02; G03B 17/24
[52] U.S. Cl. ................................. 396/317; 396/435
[58] Field of Search ........................ 354/105, 106, 354/159; 396/310, 311, 315–317, 435

[56] References Cited

U.S. PATENT DOCUMENTS

| | | | |
|---|---|---|---|
| 4,508,438 | 4/1985 | Kanaoka et al. | 354/105 |
| 5,245,373 | 9/1993 | Ogawa et al. | 354/106 |
| 5,349,402 | 9/1994 | Soshi et al. | |
| 5,389,991 | 2/1995 | Naka et al. | 354/159 |
| 5,398,088 | 3/1995 | Yamazaki et al. | 354/106 |
| 5,473,397 | 12/1995 | Miyamoto et al. | 354/106 |

FOREIGN PATENT DOCUMENTS

| | | |
|---|---|---|
| 62-103625 | 5/1987 | Japan . |
| 63-27823 | 2/1988 | Japan . |
| 6-35061 | 2/1994 | Japan . |

Primary Examiner—Michael L. Gellner
Assistant Examiner—Daniel Chapik
Attorney, Agent, or Firm—Cushman, Darby & Cushman IP Group of Pillsbury, Madison & Sutro LLP

[57] ABSTRACT

A data recording optical system which is to be used in cameras each having a plurality of photographing modes; comprises a display member and a single imaging lens system or a plurality of imaging lens systems; and is configured so as to modify data recording locations and change magnifications by moving a portion of the imaging lens system or selectively using the plurality of imaging lens systems.

14 Claims, 11 Drawing Sheets

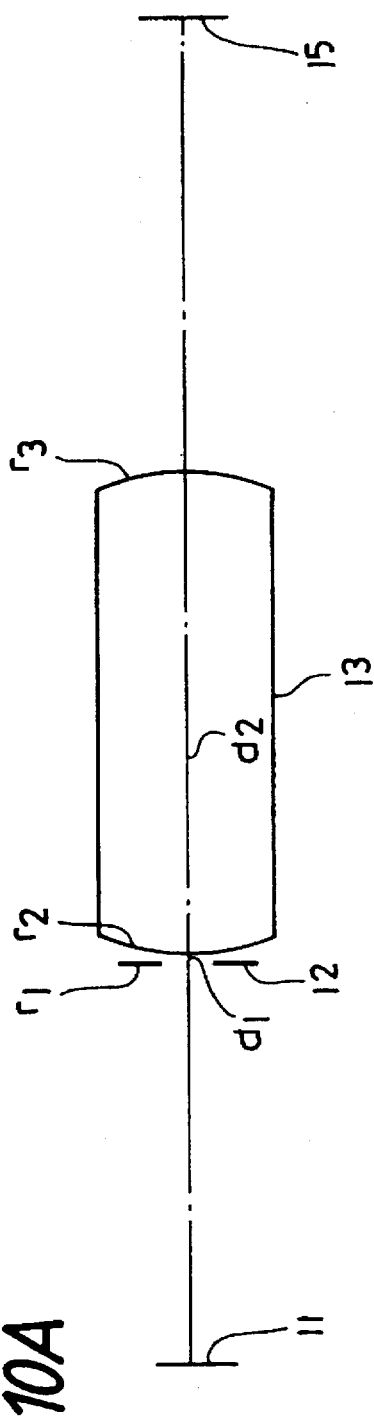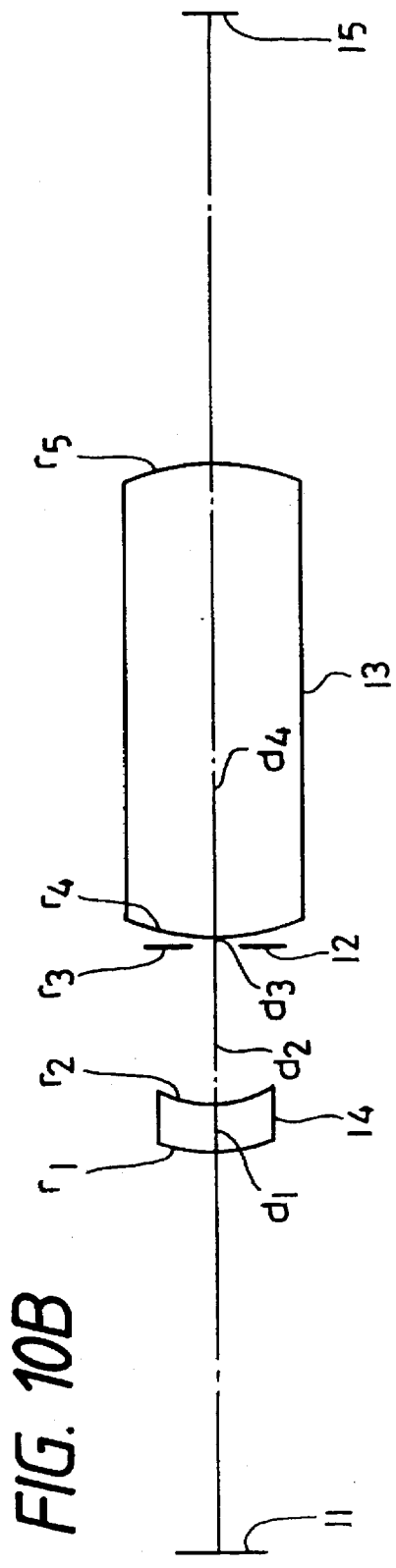
FIG. 10A
FIG. 10B

PHOTOGRAPHING APPARATUS FOR RECORDING DATA ON FILMS

BACKGROUND OF THE INVENTION a) Field of the invention

The present invention relates to a photographing apparatus which is to be used for recording data such as photographing dates on film in cameras having a plurality of photographing modes for different image sizes.

b) Description of the Prior Art

Certain photographic cameras are configured to permit the recording of data such as the photographing date, time and other data in the corner of the film.

Recording data such as the photographing dates, these data have conventionally been photographed from the rear side of the film (from sides opposite the photographic lens systems). For recording the data by this method, it is necessary to accommodate the recording mechanism in camera camera body, which inevitably thickens the rear cover of the cameras and makes it impossible to configure the camera in a compact manner.

For this reason, it has recently been proposed to adopt a method for photographing such data from the front side of the film (from the side of photographic lens systems) and products using this method have already been developed. This method permits data to be recording on the films by using a character data display member and an imaging lens system which are disposed by effectively utilizing a space reserved in front of the film and outside of a range of space occupied by a light bundle coming from a photographic lens system. This method permits the recording mechanism to be disposed on the front side of the film, and thereby makes it possible to cofigure the camera compact in a while preventing manner the rear cover of the camera from being thickened.

On the other hand, photography is now increasingly enjoyed while changing image sizes, as exemplified by cameras which permit panoramic photography. Further, photographs can now be enlarged to sizes larger than those conventionally available for strengthening impressions. When image sizes are changed, however, conventional cameras are incapable of recording some of the data or enlarge the data to awkward sizes.

A character data recording apparatus disclosed by Japanese Patent Kokai Publication No. Sho 62-103,625 uses, on a rear cover of a camera, two light emitting members which have different character sizes and are switchable from one to the other. This character data recording apparatus basically requires the use of the same number of light emitting members same as the number of image sizes compatible with a camera to accommodate this apparatus, and makes it necessary to change the size and location of the characters in conjunction with switching of the image size.

Further, Japanese Patent Kokai Publication No. Sho 63-27,823 discloses a recording apparatus which is configured so as to photograph character data from a side of a camera body. This conventional example photographs characters which are formed by light emitting members and imaged by imaging lens systems, and permits the size of the character data to be changed by switching the imaging lens systems from one to another, but is incapable of changing data recording locations.

Furthermore, Japanese Patent Kokai Publication No. Hei 6-35,061 proposes a character data recording means which comprises a fixed light emitting member and two fixed lens units, and is capable of changing data recording magnifications and locations by switching light shielding members.

Out of the conventional examples mentioned above, the character data recording apparatus disclosed by Japaneses Patent Kokai Publication No. Sho 62-103,625 is configured so as to photograph the character data from the rear, which is not desirable for configuring camera in a compact manner.

Further, the recording apparatus proposed by Japanese Patent Kokai Publication No. Sho 63-27,823 is configured so as to photograph the character data from the side of a camera body and is capable of changing data recording magnifications, but does not permit changing recording locations.

Furthermore, Japanese Patent Kokai Publication No. Hei 6-35,061 provides no concrete description of the optical system, even though it proposes character data recording means which is capable of changing booth data recording magnifications and locations.

SUMMARY OF THE INVENTION

A primary object of the present invention is to provide a photographing apparatus using an optical system which is to be used in cameras having a plurality of photographing modes provided for different image areas to be photographed (herein after to be referred to as image sizes), and configured so as to be capable of photographing character data such as photographing dates from a side of a camera body while changing both the data recording location and character size in conjunction with switching the photographing modes.

A data recording optical system to be used in the photographing apparatus according to the present invention includes an optical system for recording characters and other data on an image receiver such as film, in a camera having a plurality of photographing modes for different image sizes. This optical system includes a display member and an imaging lens system for forming images of date provided by the display member on an image forming surface of the image receiving. The imaging lens system includes a main lens unit and an auxiliary lens unit. The main lens unit is moved, and the auxiliary lens unit is set and removed into and out of an optical axis, in conjunction with the switching of the photographing modes, thereby changing data recording locations (locations on the image receiving surface of the image receiver) and magnifications.

Accordingly, the photographing apparatus using the data recording optical system according to the present invention includes a photographic lens system, an image receiver for receiving images formed by an imaging lens system and an optical system which is disposed on a side where rays to be used for photographing are incident on the image receiver so that it projects data different from the above-mentioned images onto the image receiver. The optical system includes a data display member and an imaging lens system for projecting rays from the data display member to the image. The imaging lens system includes a main lens unit and an auxiliary lens unit. A plurality of optical paths are formed from the data display member to different locations on the image receiver means by moving at least the main lens unit. The auxiliary lens unit is disposed in at least one of the plurality of optical paths, and data provided by the data display member are projected through the plurality of optical paths to different locations on the image receiver at different magnifications.

Furthermore, the objects of the present invention can also be accomplished by configuring the photographing apparatus according to the present invention so as to be capable of setting and removing an auxiliary lens unit into and out of an optical path formed between a data display and an image receiver in conjunction with a movement of a main lens unit.

A first type optical system to be used in the photographing apparatus according to the present invention is an optical system which is to be used in cameras each having a plurality of photographing modes for different image sizes, which is configured so as to photograph characters and other data onto a film from a side of a camera body, and which includes of a display member and an imaging lens system. The imaging lens system includes a main lens unit and an auxiliary lens unit. At least the main lens unit moves in conjunction with the switching of the photographing modes, and the auxiliary lens unit is set into an optical path in conjunction with the movement of the main lens unit. This optical system is configured so that an optical path to a film surface is moved by moving the main lens unit. In this manner, images of character data provided by the display member are formed at different locations on the film surface, and the magnification is changed by setting and removing the auxiliary lens unit into and out of the optical path.

Further, a second type optical system to be used in the photographing apparatus according to the present invention, is an optical system which is to be used in cameras each having a plurality of photographing modes for different sized images is configured so as to photograph characters and other data onto a film surface from the side of a camera body. This system includes a data display member and a plurality of imaging lens systems each having at least one aspherical surface. This optical system permits images to be formed of character data provided by the data display member at different locations on the film surface and changing magnifications by using the imaging lens systems selectively in conjunction with the switching of the photographing modes.

The second type of optical system to be used in the photographing apparatus according to the present invention, is an optical system which is to be used in cameras each having a plurality of photographing modes for different image sizes, and includes an optical system for recording characters and other data on an image receiver such as a film. This system uses an optical system which has a display unit and imaging lens systems each having at least one aspherical surface and is capable of changing the recording location of character data (locations on an image receiving surface of the image receiver) and the magnification by exchanging the imaging lens systems with one another in conjunction with switching of the photographing modes.

Accordingly, a photographing apparatus using the second type data recording optical system according to the present invention includes a photographic lens system, an image receiver for receiving images formed by the photographic lens system and an optical system which is disposed on a side where rays to be used for photographing are incident on the image receiver so that it projects data which are different from the images to the image receiver. The optical system includes a data display member and a plurality of imaging lens systems which form optical paths for projecting rays from the data display member to the image receiver. Each of the imaging lens systems has at least one aspherical surface. Rays from the data display member are selectively led to the optical paths, whereby the photographing apparatus is capable of projecting data provided by the display member to different locations on the image receiver at different magnifications by switching the plurality of optical paths from one to another.

FIG. 3A and FIG. 3B show diagrams exemplifying recording locations on a film surface: FIG. 3A showing a case wherein sizes of a longer side and a shorter side are changed, whereas FIG. 3B shows another case wherein a size of only the shorter side is changed. In other words, the image size shown in FIG. 3B corresponds to a panoramic image size. In each of FIG. 3A and FIG. 3B, a solid line 1 indicates an image size in a first mode in which characters 3 are recorded at a corner of the film surface. Further, a dashed line 2 indicates an image size in a second mode in which characters 4 are recorded at the location shown in the drawings. The characters 4 in the second mode are recorded in a size contracted as compared with that of the characters 3 in the first mode. That is to say, the data recording optical system to be used in the photographing apparatus according to the present invention described above is capable of changing recording locations and magnifications on the film surface as shown in FIG. 3A and FIG. 3B in conjunction with the switching of the photographing modes. Accordingly, the characters recorded in both the photographing modes are set in conditions equivalent to each other when photographs taken in both the modes are printed in the same size. Needless to say, these character data are not always in the same size but may have many optical sizes as long as they are not unnatural, and the recording location is modifiable on the film surface.

BRIEF DESCRIPTION OF THE DRAWINGS

FIG. 10A and FIG. 10B show development views illustrating an optical system to be used in the fifth embodiment of the present invention;

DETAILED DESCRIPTION OF THE PREFERRED EMBODIMENTS

The data recording optical system according to the present invention will now be described in more detail below with reference to the preferred embodiments illustrated in the accompanying drawings.

Figure 1:
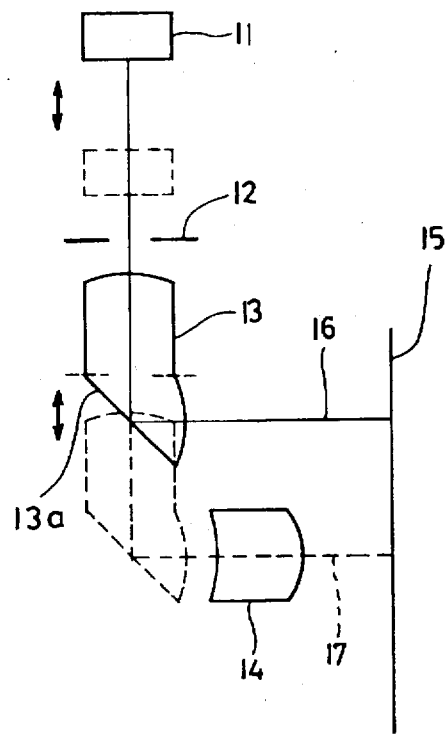
FIG. 1 shows a sectional view illustrating a configuration selected for a first embodiment and a second embodiment of the data recording optical system to be used in the photographing apparatus according to the present invention.
Figure 2A:
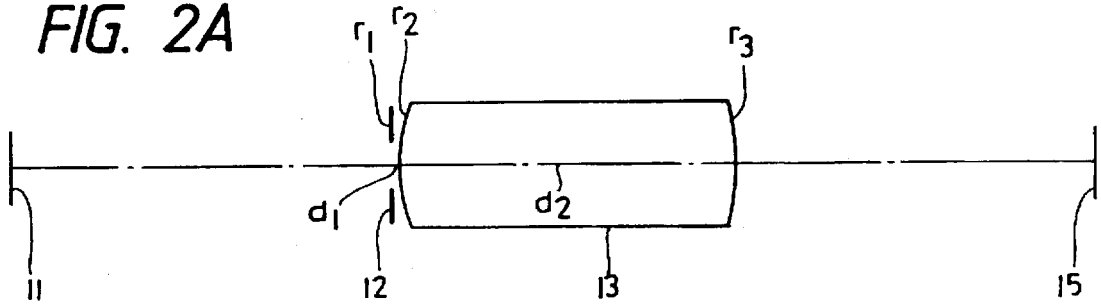
FIG. 2A and FIG. 2B show development views illustrating an optical system to be used in the first embodiment of the present invention.
Figure 2B:
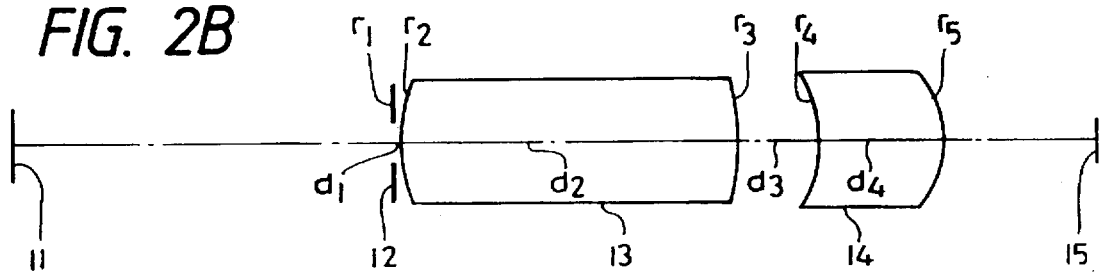
Figure 3A:
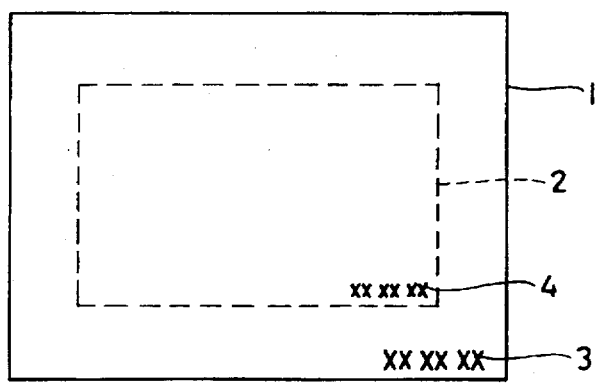
FIG. 3A and FIG. 3B show diagrams exemplifying recording of character data on film surface by using the optical system according to the present invention.
Figure 3B:
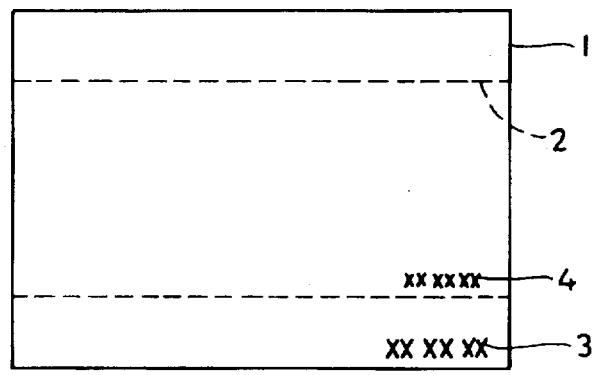

FIG. 1 shows a diagram descriptive of a concept selected for the first embodiment of the data recording optical system according to the present invention, whereas FIG. 2A and FIG. 2B show development views of an optical system to be used in the first embodiment of the present invention. In these drawings, reference numeral 11 represents a display member which provides characters and other data, for example, as shown in FIG. 3. Further, a reference numeral 12 designates an aperture stop, reference numeral 13 denotes a main lens unit, reference numeral 14 represents an auxiliary lens unit, reference numeral 15 designates a film surface, reference numeral 16 denotes an optical axis in a first mode of the first embodiment and reference numeral 17 represents an optical axis in a second mode of the first embodiment.

In the first mode of the first embodiment, images of characters are formed on the film surface 15 by the display member 11, the aperture stop 12 and the main lens unit 13. The main lens unit 13 used in the first embodiment is a prism-shaped lens unit which has a reflecting surface 13a as shown in FIG. 1 and serves for photographing, from the front side of the film surface 15, character data provided by the display member 11 disposed on a top surface of a camera onto the film surface 15. Further, the main lens unit 13 has a side surface of emergence ($r_3$) which is configured as an aspherical surface for correcting spherical aberration and coma.

In the second mode of the first embodiment, images of the characters are formed on the film surface 15 by cooperation of the display member 11, the aperture stop 12, the main lens unit 13 and the auxiliary lens unit 14. For setting the first embodiment in the second mode thereof, the display member 11, the aperture stop 12 and the main lens unit are moved integrally, for example, to the locations indicated by dashed lines in FIG. 1 until the auxiliary lens unit is aligned with the optical axis in the second mode. The auxiliary lens unit may be fixed at the location shown in FIG. 1 or interposed as shown in this drawing in conjunction with the movements of the display member 11, the aperture stop 12 and the main lens unit 13. The auxiliary lens unit in the first embodiment is a positive meniscus lens unit which has aspherical surfaces on both sides thereof.

Though the main lens unit 13 and the others mentioned above may be moved along optical loci, these members are moved so as to keep a constant distance between the main lens unit 13 and the film surface 15, or in parallel with the film surface 15. Further, the first embodiment of the present invention has an advantage that it permits simplifying a moving mechanism of the main lens unit 13 and the other members only in a direction along a shorter side of the film surface 15.

The first embodiment of the present invention has numerical data listed below:

---

Embodiment 1

---

(first mode)
    magnification = −1.0, IO = 30 mm
    effective F number = 8.0
$r_1 = \infty$ (stop)
    $d_1 = 0.2000$
$r_2 = 4.7820$
    $d_2 = 9.4000$    $n_1 = 1.48993$    $v_1 = 57.66$
$r_3 = -5.3580$ (aspherical surface)
aspherical surface coefficients
(3rd surface)
    $P = 0.0000, A_4 = 0.24044 \times 10^{-2}, A_6 = -0.19065 \times 10^{-2}$
    $A_8 = 0.81215 \times 10^{-3}$
(Second Mode)
    magnification = −0.6, IO = 30 mm
    effective F number 4.8
$r_1 = \infty$ (stop)
    $d_1 = 0.2000$
$r_2 = 4.7820$
    $d_2 = 9.4000$    $n_1 = 1.48993$    $v_1 = 57.66$
$r_3 = -5.3580$ (aspherical surface)
    $d_3 = 2.3000$
$r_4 = -5.8080$ (aspherical surface)
    $d_4 = 3.6000$    $n_2 = 1.48993$    $v_2 = 57.66$
$r_5 = -2.5630$ (aspherical surface)
aspherical surface coefficients
(3rd surface)
    $P = 0.0000, A_4 = 0.24044 \times 10^{-2}, A_6 = -0.19065 \times 10^{-2}$
    $A_8 = 0.81215 \times 10^{-3}$
(4th surface)
    $P = 3.0000, A_4 = -0.12105 \times 10^{-1}, A_6 = -0.42911 \times 10^{-2}$
    $A_8 = 0.85125 \times 10^{-3}$
(5th surface)
    $P = 1.0000, A_4 = 0.28810 \times 10^{-2}, A_6 = -0.34962 \times 10^{-3}$
    $A_8 = 0.25709 \times 10^{-3}$

--- wherein the reference symbols $r_1, r_2, \ldots$ represent radii of curvature on surfaces of respective optical components, the reference symbols $d_1, d_2, d_3$ and $d_4$ designate thicknesses of the respective optical components and airspaces reserved therebetween, the reference symbols $n_1$ and $n_2$ denote refractive indices of the respective lens units, and the reference symbols $v_1$ and $v_2$ represent Abbe's number of the respective lens units.

In the first mode of the first embodiment, a distance as measured from the display member 11 to the film surface 15 is 30 mm, an imaging magnification is set at −1.0× and the optical system has an effective F number of 8.0. In the second mode of the first embodiment, the display member 11 is kept at the distance of 30 mm as measured from the film surface 15, an imaging magnification is set at −0.6× and the optical system has an effective F number of 4.8.

In the first embodiment, light intensity is enhanced in the second mode due to a fact that the aperture stop is used commonly between the first mode and the second mode. For lowering light intensity in the second mode, it is sufficient to modify an exposure time, interpose an ND filter or mix a dye with a material to be used for forming the auxiliary lens unit 14.

Figure 4A:
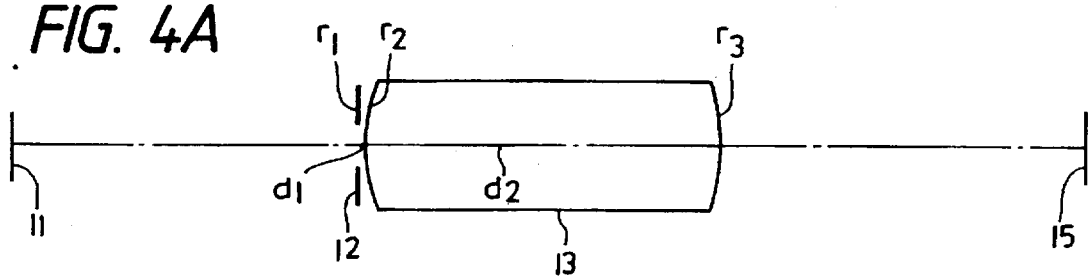
FIG. 4A and FIG. 4B show development views illustrating an optical system to be used in the second embodiment of the present invention.
Figure 4B:
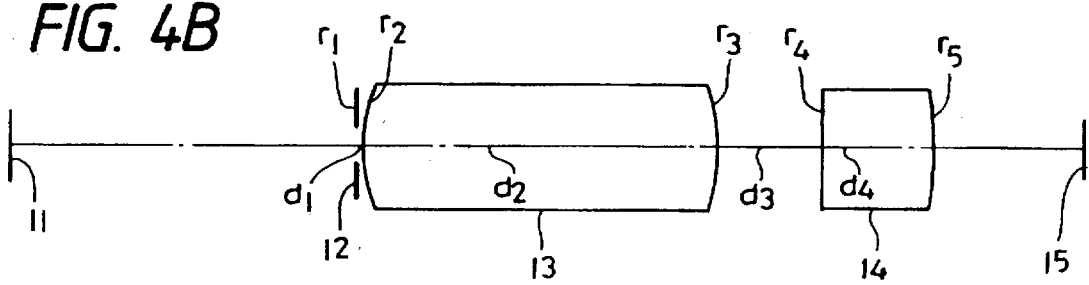

The second embodiment of the present invention has a configuration which is the same as that of the first embodiment and uses an optical system shown in FIG. 4A and FIG. 4B in development conditions.

The second embodiment has numerical data which are listed below:

---

Embodiment 2

(first mode)
  magnification = −1.0, IO = 30 mm
  effective F number = 8.0

$r_1 = \infty$ (stop)
    $d_1 = 0.2000$
$r_2 = 4.9510$
    $d_2 = 9.9000$    $n_1 = 1.48993$    $v_1 = 57.66$
$r_3 = -4.8970$ (aspherical surface)
aspherical surface coefficients
(3rd surface)
  $P = -2.5000$, $A_4 = -0.88659 \times 10^{-3}$
  $A_6 = -0.10070 \times 10^{-2}$, $A_8 = 0.43666 \times 10^{-3}$
(second Mode)
  magnification = 0.8, IO = 30 mm
  effective F number = 6.4

$r_1 = \infty$ (stop)
    $d_1 = 0.2000$
$r_2 = 4.9510$
    $d_2 = 9.9000$    $n_1 = 1.48993$    $v_1 = 57.66$
$r_3 = -4.8970$ (aspherical surface)
    $d_3 = 2.9000$
$r_4 = \infty$
    $d_4 = 3.1000$    $n_2 = 1.48993$    $v_2 = 57.66$
$r_5 = -9.9880$ (aspherical surface)
aspherical surface coefficients
(3rd surface)
  $P = -2.5000$, $A_4 = -0.88659 \times 10^{-3}$
  $A_6 = -0.10070 \times 10^{-2}$, $A_8 = 0.43666 \times 10^{-3}$
(5th surface)
  $P = 1.0000$, $A_4 = -0.35947 \times 10^{-2}$
  $A_6 = 0.13282 \times 10^{-2}$, $A_8 = 0.22849 \times 10^{-3}$

---

In the second embodiment, an auxiliary lens unit 14 is configured as a plano-convex lens unit and has an aspherical surface ($r_5$) on a side of a film surface. In a first mode of the second embodiment, a display member 11 is kept at a distance of 30 mm as measured from the film surface, an imaging magnification is set at −1.0× and the optical system has an effective F number of 8.0. In a second mode of the second embodiment, the display member 11 is kept at the distance of 30 mm as measured from the film surface, an imaging magnification is set at −0.8× and the optical system has an effective F number of 6.4 by using an aperture stop which is common to both the modes.

Figure 5:
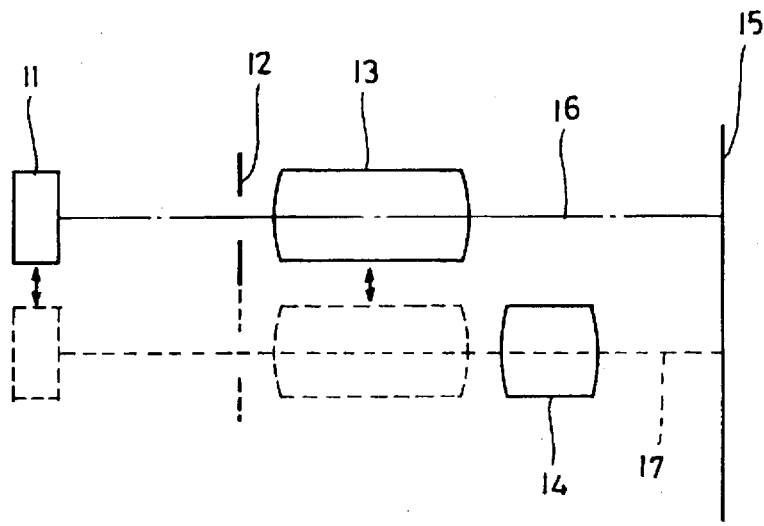
FIG. 5 shows a sectional view illustrating a configuration of a third embodiment of the data recording optical system according to the present invention.
Figure 6A:
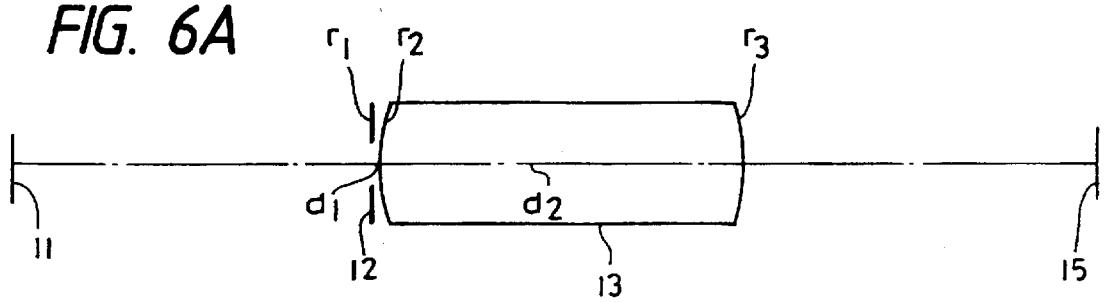
FIG. 6A and FIG. 6B show development views illustrating an optical system to be used in the third embodiment of the present invention.
Figure 6B:
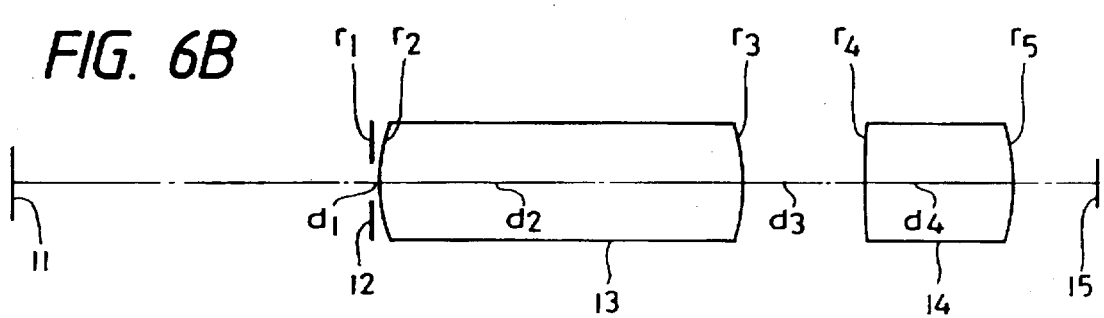

FIG. 5 shows a diagram descriptive of a concept adopted for a third embodiment of the present invention, whereas FIG. 6A and FIG. 6B show development views of an optical system used in the third embodiment. In these drawings, reference numeral 11 represents a display member, reference numeral 12 designates an aperture stop, reference numeral 13 denotes a main lens unit, reference numeral 14 represents an auxiliary lens unit, reference numeral 15 designates a film surface, reference numeral 16 denotes an optical axis in a first mode of the third embodiment and reference numeral 17 represents an optical axis in a second mode of the third embodiment. In both modes, the optical axes are straight and characters provided by the display member 11 are photographed nearly from a front side of the film surface.

In the first mode of the third embodiment, images of characters are formed on the film surface by the display member 11, the aperture stop 12 and the main lens unit 13.

In the second mode of the third embodiment, images of characters are formed on the film surface 15 by the display member 11, the aperture stop 12, the main lens unit 13 and the auxiliary lens unit 14.

The third embodiment is switched from the first mode to the second mode thereof by moving the display member 11, the aperture stop 12 and the main lens unit 13 until they are aligned with the optical axis in the second mode. When the display member 11 is prepared in a pair and disposed on the optical axis 16 in the first mode and on the optical axis 17 in the second mode respectively, the third embodiment can be switched from the first mode to the second mode by moving only the aperture stop 12 and the main lens unit 13.

The third embodiment has the following numerical data:

---

Embodiment 3

(first mode)
  magnification = −1.0, IO = 30 mm
  effective F number = 8.0

$r_1 = \infty$ (stop)
    $d_1 = 0.2000$
$r_2 = 4.8420$
    $d_2 = 10.0000$    $n_1 = 1.48993$    $v_1 = 57.66$
$r_3 = -4.9580$ (aspherical surface)
aspherical surface coefficients
(3rd surface)
  $P = -2.4000$, $A_4 = -0.67484 \times 10^{-3}$, $A_6 = -0.10790 \times 10^{-2}$,
  $A_8 = 0.50112 \times 10^{-3}$
(second mode)
  magnification = −0.7, IO = 30 mm
  effective F number = 5.6

$r_1 = \infty$ (stop)
    $d_1 = 0.2000$
$r_2 = 4.8420$
    $d_2 = 10.0000$    $n_1 = 1.48993$    $v_1 = 57.66$
$r_3 = -4.9580$ (aspherical surface)
    $d_3 = 3.4000$
$r_4 = 23.8920$
    $d_4 = 4.2000$    $n_2 = 1.48993$    $v_2 = 57.66$
$r_5 = -5.5630$
aspherical surface coefficients
(3rd surface)
  $P = -2.4000$, $A_4 = -0.67484 \times 10^{-3}$
  $A_6 = -0.10790 \times 10^{-2}$, $A_8 = 0.50112 \times 10^{-3}$

---

The first mode of the third embodiment is designed for specifications which are the same as those for the first or the second embodiment, i.e., a distance of 30 mm as measured from the display member to the film surface, an imaging magnification of −1.0× and an effective F number of 8.0. In the second mode, the display member is kept at the distance of 30 mm as measured from the display member to the film surface, an imaging magnification is set at −0.7× and the optical system has an effective F number of 5.6. Further, the auxiliary lens unit is configured as a biconvex lens unit having spherical surfaces on both sides thereof.

Figure 7:
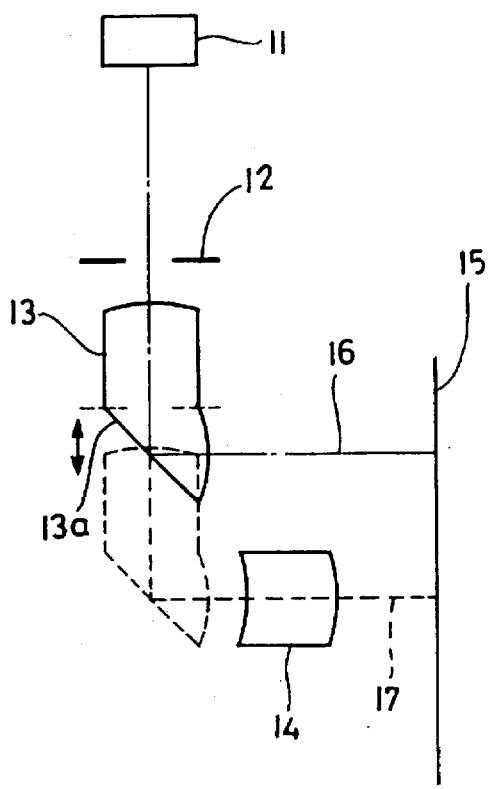
FIG. 7 shows a sectional view illustrating a configuration of a fourth embodiment of the data recording optical system according to the present invention.
Figure 8A:
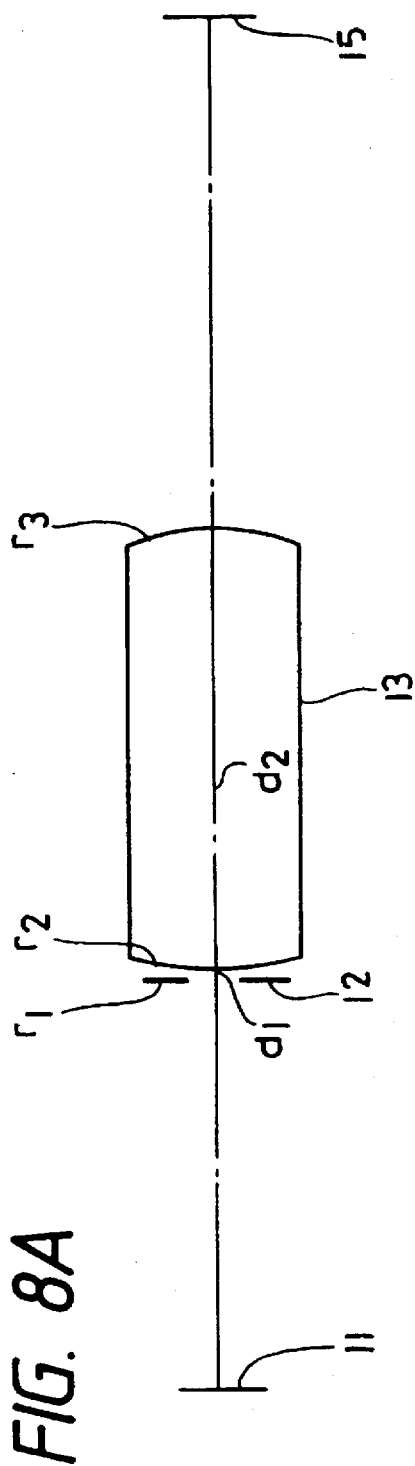
FIG. 8A and FIG. 8B show development views illustrating an optical system to be used in the fourth embodiment of the present invention.
Figure 8B:
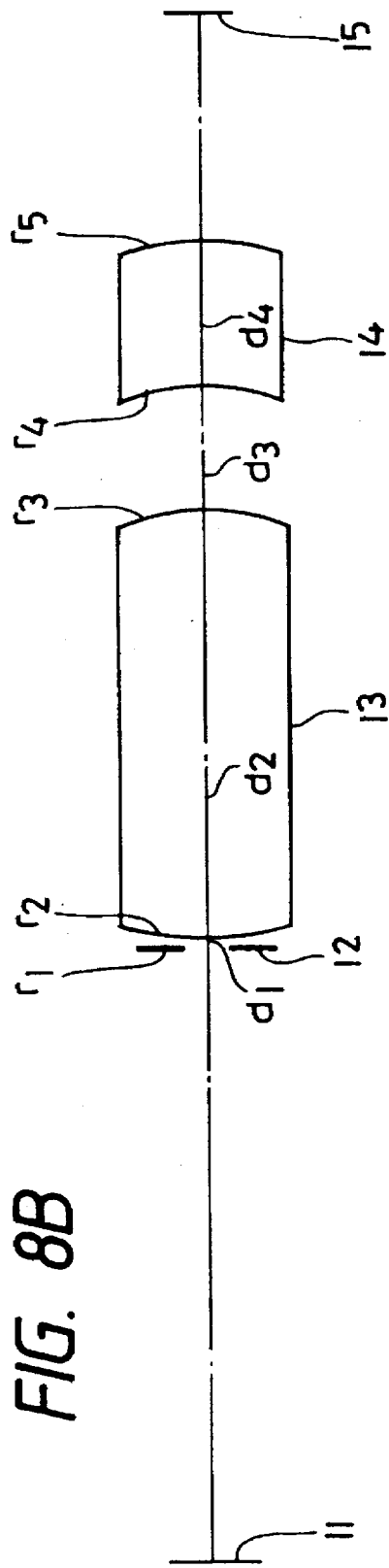

FIG. 7 shows a diagram descriptive of a concept selected for a fourth embodiment of the present invention, whereas FIG. 8A and FIG. 8B show development views of an optical system used in the fourth embodiment. In these drawings, reference numeral 11 represents a display member, reference numeral 12 designates an aperture stop, reference numeral 13 denotes a main lens unit, reference numeral 14 represents an auxiliary lens unit, reference numeral 15 designates a film surface, reference numeral 16 denotes an optical axis in a first mode of the fourth embodiment and reference numeral 17 represents an optical axis in a second mode of the fourth embodiment.

In the first mode of the fourth embodiment, images of characters are formed on the film surface 15 by the display member 11, the aperture stop 12 and the main lens unit 13.

The main lens unit 13 is configured as a prism-shaped lens unit which has a reflecting surface and serves for photographing character data provided by the display member 11 disposed on a top surface of a camera from before the film surface 15.

In the second mode of the fourth embodiment, images of the characters are formed on the film surface 15 by the display member 11, the aperture stop 12, the main lens unit 13 and the auxiliary lens unit 14. For switching the fourth embodiment from the first mode to the second mode thereof, the aperture stop 12 and the main lens unit 13 are moved integrally until they are aligned with the optical axis 17 in the second mode.

The fourth embodiment has numerical data which are listed below:

---
Embodiment 4
---

(first mode)
  magnification = −1.0, IO = 30 mm
  effective F number = 8.0
$r_1 = \infty$ (stop)
  $d_1 = 0.2000$
$r_2 = 6.2800$
  $d_2 = 9.7000$   $n_1 = 1.48993$   $v_1 = 57.66$
$r_3 = -4.2360$ (aspherical surface)
aspherical surface coefficients
(3rd surface)
  $P = -0.5000, A_4 = -0.49550 \times 10^{-3}$
  $A_6 = -0.16538 \times 10^{-3}, A_8 = 0.10243 \times 10^{-3}$
(second mode)
  magnification = −0.7, IO = 35 mm
  effective F number = 8.7
$r_1 = \infty$ (stop)
  $d_1 = 0.2000$
$r_2 = 6.2800$
  $d_2 = 9.7000$   $n_1 = 1.48993$   $v_1 = 57.66$
$r_3 = -4.2360$ (aspherical surface)
  $d_3 = 2.8000$
$r_4 = -4.6150$
  $d_4 = 3.2000$   $n_2 = 1.48993$   $v_2 = 57.66$
$r_5 = -5.1230$ (aspherical surface)
aspherical surface coefficients
(3rd surface)
  $P = -0.5000, A_4 = -0.49550 \times 10^{-3}$
  $A_6 = -0.16538 \times 10^{-3}, A_8 = 0.10243 \times 10^{-3}$
(5th surface)
  $P = -0.5000, A_4 = 0.35973 \times 10^{-3}$
  $A_6 = 0.67800 \times 10^{-3}, A_8 = -0.46321 \times 10^{-3}$

---

The first mode of the fourth embodiment is designed for specifications which are the same as those of the first, second or the third embodiment, i.e., a distance of 30 mm as measured from the display member to the film surface, an imaging magnification of −1.0× and an effective F number of 8.0. In the second mode of the fourth embodiment, the distance as measured from the display section to the film surface is changed to 35 mm, an imaging magnification is set at −0.7× and the optical system has an effective F number of 8.7. Further, the auxiliary lens unit is configured as a positive meniscus lens unit having an aspherical surface on one side thereof.

In the fourth embodiment in which the display member is kept fixed, the modes are switched from one to the other by moving the main lens unit 13, etc. for a distance of 5 mm in parallel with the film surface.

Figure 9:
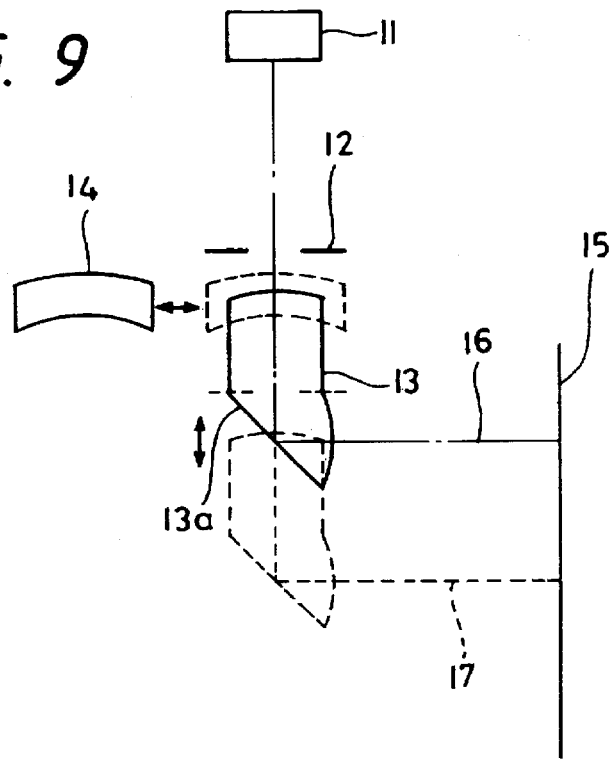
FIG. 9 shows a sectional view illustrating a configuration of a fifth embodiment of the data recording optical system according to the present invention.

FIG. 9 shows a diagram illustrating a concept selected for a fifth embodiment of the present invention, whereas FIG. 10A and FIG. 10B show development views of this embodiment. In these drawings, reference numeral 11 represents a display member, reference numeral 12 designates an aperture stop, reference numeral 13 denotes a main lens unit, reference numeral 14 represents an auxiliary lens unit, reference numeral 15 designates a film surface, reference numeral 16 denotes an optical axis in a first mode of the fifth embodiment and reference numeral 17 represents an optical axis in a second mode of the fifth embodiment.

In the first mode of the fifth embodiment, images of characters are formed on the film surface 15 by the display member 11, the aperture stop 12 and the main lens unit 13. The main lens unit is configured as a prism-shaped lens unit which has a reflecting surface and serves for photographing, from before the film surface 15, character data provided by the display member 11 disposed on a top surface of the camera.

In the second mode of the fifth embodiment, images of the characters are formed on the film surface 15 by the display member 11, the auxiliary lens unit 14, the aperture stop 12 and the main lens unit 13. To switch the fifth embodiment from the first mode to the second mode thereof, the aperture stop 12 and the main lens unit 13 are moved integrally until they are aligned with the optical axis 17 in the second mode and auxiliary lens unit is interposed on a side of the aperture stop which is nearer the display member 11.

The fifth embodiment has numerical data listed below:

---
Embodiment 5
---

(first mode)
  magnification = −1.0, IO = 30 mm
  effective F number = 8.0
$r_1 = \infty$ (stop)
  $d_1 = 0.2000$
$r_2 = 5.0490$
  $d_2 = 10.8000$   $n_1 = 1.48993$   $v_1 = 57.66$
$r_3 = -4.4240$ (aspherical surface)
aspherical surface coefficients
(3rd surface)
  $P = -2.8000, A_4 = -0.27070 \times 10^{-2}, A_6 = -0.51177 \times 10^{-3}$,
  $A_8 = 0.25168 \times 10^{-3}$
(second mode)
  magnification = −0.6, IO = 35 mm
  effective F number = 8.0
$r_1 = 3.3890$
  $d_1 = 1.1000$   $n_1 = 1.48993$   $v_1 = 57.66$
$r_2 = 2.1800$ (aspherical surface)
  $d_2 = 3.6000$
$r_3 = \infty$ (stop)
  $d_3 = 0.2000$
$r_4 = 5.0490$
  $d_4 = 10.8000$   $n_2 = 1.48993$   $v_2 = 57.66$
$r_5 = -4.4240$ (aspherical surface)
aspherical surface coefficients
(2nd surface)
  $P = 1.0000, A_4 = -0.16616 \times 10^{-3}$
  $A_6 = -0.11819 \times 10^{-1}, A_8 = -0.53512 \times 10^{-3}$
(5th surface)
  $P = -2.8000, A_4 = -0.27070 \times 10^{-2}$
  $A_6 = -0.51177 \times 10^{-3}, A_8 = 0.25168 \times 10^{-3}$

---

The display member is set at a distance of 30 mm as measured from the film surface, an imaging magnification is set at −1.0× and the optical system has an effective F number of 8.0 in the first mode of the fifth embodiment, whereas the display section is set at a distance of 35 mm as measured from the film surface, an imaging magnification is set at −0.6× and the optical system has an effective F number of 8.0 in the second mode of the fifth embodiment. Further, the auxiliary lens unit is configured as a negative meniscus lens unit having an aspherical surface on one side thereof.

In the fifth embodiment in which the display member 11 is kept fixed, the modes are switched from one to the other by moving the main lens unit 13, etc. for a distance of 5 mm in parallel with the film surface.

Though each of the first through fifth embodiments described above is configured so as to lower a magnification by switching from the first mode to the second mode, it is possible to configure the embodiment so as to enhance a magnification by switching from the first mode to the second mode.

Figure 11:
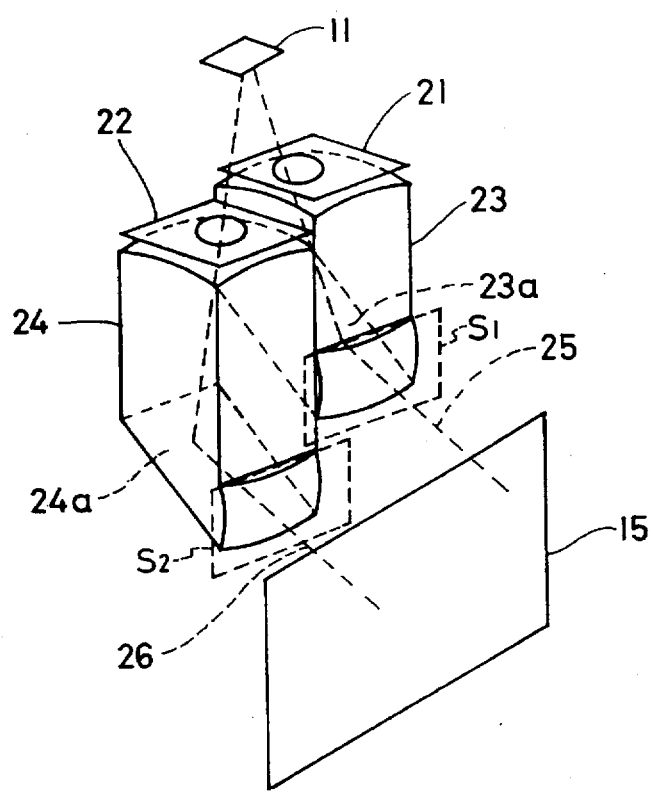
FIG. 11 shows a perspective view illustrating a configuration of a sixth embodiment of the photographing apparatus according to the present invention.
Figure 12A:
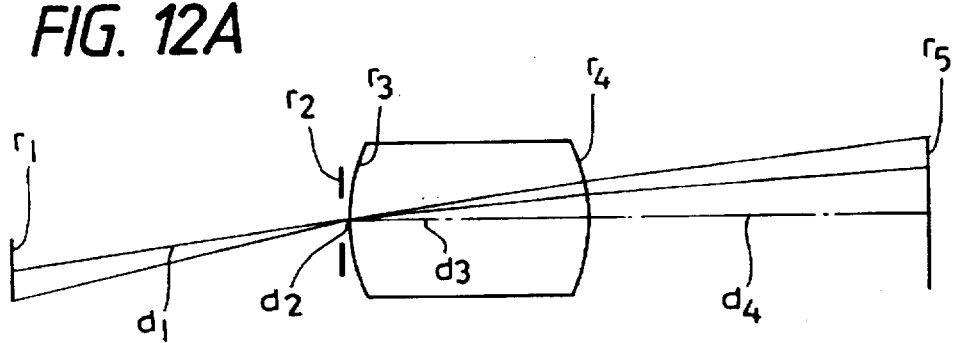
FIG. 12A and FIG. 12B show development views illustrating an optical system to be used in the sixth embodiment of the present invention.
Figure 12B:
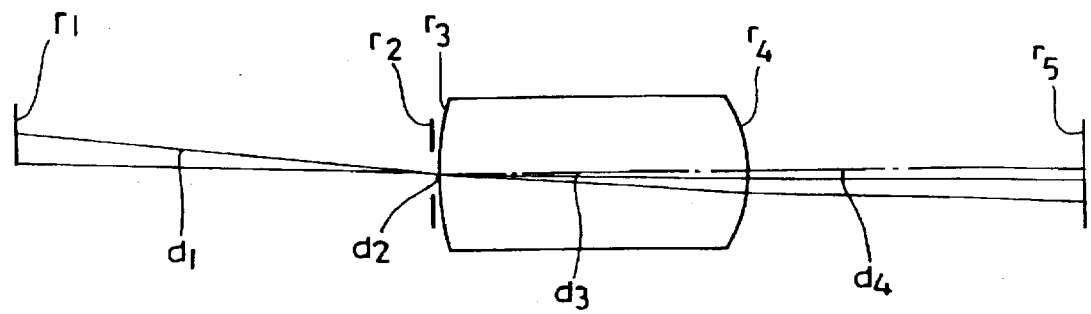

FIG. 11 shows a diagram illustrating a concept adopted for a sixth embodiment of the photographing apparatus according to the present invention which uses an optical system shown in FIG. 12A and FIG. 12B in developed conditions (where optical axes are unfolded at the reflecting surfaces into a straight line). In these drawings, reference numeral 11 represents a display member for providing data such as characters, reference numerals 21 and 22 designate aperture stops, reference numerals 23 and 24 denote imaging lens systems, reference numeral 15 represents a film surface, reference numerals 25 and 26 designate axes of optical paths leading from the display member 11 to the film surface, and reference numerals 23a and 24a denote reflecting surfaces. Out of these members, the display member 11, the aperture stop 21, the imaging lens system 23, the film surface 15, the optical axis 25 and the reflecting surface 23a are to be used in a first mode of the sixth embodiment, whereas the display member 11, the aperture stop 22, the imaging lens system 24, the film surface 15, the optical axis 26 and the reflecting surface 24a are to be employed in a second mode of the sixth embodiment. Each of the imaging lens systems to be used in the first mode and the second mode of the sixth embodiment is a prism-shaped lens component which is integrally molded so as to have the reflecting surface 23a or 24a as well as a curved surface of incidence and a curved surface of emergence having imaging functions. The imaging lens system 23 is slightly shorter than the imaging lens system 24, and surfaces of incidence of the aperture stop 21 and the imaging lens system 23 are disposed at locations which are closer to the display member 11 than locations at which surfaces of incidence of the aperture stop 22 and the imaging lens system 24 are disposed. Further, the two imaging lens systems 23 and 24 have optical axes which are substantially in parallel with each other. In the sixth embodiment, the optical axes are nearly in parallel with the film surface 15 before they reach the reflecting surfaces 23a and 24a of the imaging lens systems 23 and 24, and the reflecting surfaces 23a and 24a are inclined at an angle of about 45° so that data will be projected to the film surface 15 nearly perpendicularly from either of the optical paths in the first mode and the second mode. Though the two imaging lens systems 23 and 24 are disposed in a condition where their sides are in contact with each other, these lens systems may be molded as an integral member. In either of the first and second modes, rays emitted from the display member 11 pass through the aperture stop 21 or 22, fall on the imaging lens system 23 or 24, are reflected by the reflecting surface 23a or 24a, emerge from the imaging lens system 23 or 24 and are imaged on the film surface.

In the sixth embodiment wherein a surface of emergence of the imaging lens system 23 is disposed lower than a surface of emergence of the imaging lens system 24, data are recorded on the film surface 15 at more central locations in the second mode than data recording locations in the first mode. The sixth embodiment is configured so as to permit changing angles of the reflecting surfaces 23a and 24a, thereby changing angles of optical paths which are formed for allowing data to be incident from the imaging lens systems 23 and 24 onto the film surface 15. Accordingly, the sixth embodiment permits photographing characters and other data from an adequate location which constitutes no hindrance to a photographing light bundle for a photographic lens system. However, it is necessary to allow a light bundle to be incident at an adequate angle onto the film surface 15 since images of the characters may be deformed or partially deviate from a depth of field and blurred when the light bundle is incident onto the film surface 15 at an angle which is too large.

Further, the sixth embodiment uses a single display member which is disposed nearly in the middle between the two aperture stops 21 and 22. Accordingly, optical paths 25 and 26 are inclined with regard to the optical axes of the imaging lens systems 23 and 24 respectively, whereby the sixth embodiment uses an optical system which is eccentric as a whole. Speaking concretely, the optical axis of the imaging lens system 23 is 3 mm apart from the optical axis of the imaging lens system 24 and the display member 11 is disposed in the middle between the imaging lens systems. In case of this composition, a light bundle coming from the display member may be eclipsed by either of the imaging lens systems when distances as measured from the display member 11 to the imaging lens systems 23 and 24 respectively are largely different from each other. In FIG. 11, a light bundle to be incident on the imaging lens system 24 may be eclipsed by the imaging lens system 23. Such an eclipse can be prevented simply by increasing a distance reserved between the two imaging lens systems 23 and 24, but such a preventive measure will pose problems that enlargement of the optical system, may make correction of aberration difficult resulting in images of characters being badly deformed due to oblique intersection of the optical paths of center axes of the optical system with the film surface. To solving these problems, the surfaces of incidence of the imaging lens systems 23 and 24 are disposed as close as possible to each other, or within a deviation of 5 mm, in the optical system according to the present invention.

In the sixth embodiment, each of the imaging lens systems is composed of a single biconvex lens component which has an aspherical surface of emergence. This aspherical surface serves to correct spherical aberration and coma.

The sixth embodiment has, in the first mode thereof, a distance (IO) of 30 mm as measured from the display member to the film surface, an imaging magnification of −1.0× and an effective F number of 8.0 in the first mode thereof; and, in the second mode, a distance IO of 35 mm, and imaging magnification of −0.7× and an effective F number of 6.5 by using the aperture stop which is employed in the first mode. Since light intensity is enhanced in the second mode due to the employment of the common aperture stop between the first mode and the second mode, it is proper to lower the light intensity in the second mode by selecting a modified exposure time, using an additional ND filter or mixing a dye with a material which is to be used for fabricating the imaging lens system 24.

The sixth embodiment has numerical data listed below:

---

Embodiment 6

---

(first mode)
  magnification = −0.1, IO = 30 mm
  effective F number = 8.0
$r_1$ = display member
  $d_1$ = 10.85
$r_2 = \infty$ (stop)
  $d_2$ = 0.20
$r_3$ = 5.466
  $d_3$ = 7.85    $n_1$ = 1.48993    $v_1$ = 57.66
$r_4$ = −4.495 (aspherical surface)
  $d_4$ = −5.387
$r_5$ = film surface
aspherical surface coefficients -continued Embodiment 6

(4th surface)
$P = 0.5549$, $A_4 = 1.6133 \times 10^{-3}$, $A_6 = -1.8499 \times 10^{-4}$,
$A_8 = 4.0395 \times 10^{-5}$
(second mode)
magnification = $-0.7$, IO = 35 mm
effective F number = 6.5
$r_1$ = display member
   $d_1 = 13.63$
$r_2 = \infty$ (stop)
   $d_2 = 0.20$
$r_3 = 9.679$
   $d_3 = 10.07$    $n_1 = 1.48993$    $v_1 = 57.66$
$r_4 = -4.495$ (aspherical surface)
   $d_4 = 11.10$
$r_5$ = film surface
aspherical surface coefficients
(4th surface)
$P = 0.1892$, $A_4 = 3.7695 \times 10^{-4}$
$A_6 = -3.7892 \times 10^{-5}$, $A_8 = 9.9434 \times 10^{-6}$ In the sixth embodiment, the imaging lens systems 23 and 24 may be disposed separately, cemented to each other or molded as an integral member. For switching between the first and second photographing modes, it is possible to equip the aperture stops 21 and 22 with shutter mechanisms or dispose separate shutter mechanisms $S_1$ and $S_2$, for example, in the vicinities of surfaces of emergence of the imaging lens systems. Shutter mechanisms can easily be disposed in the sixth embodiment in which the distance as measured from the surface of emergence to the film surface remains unchanged between the first mode and the second mode. The switching between the first mode and the second mode can be performed by exchanging the right side section with the left side section. Further, it is preferable from a viewpoint of manufacturing cost to configure the reflecting surfaces 23a and 24a as totally reflecting surfaces.

Figure 13:
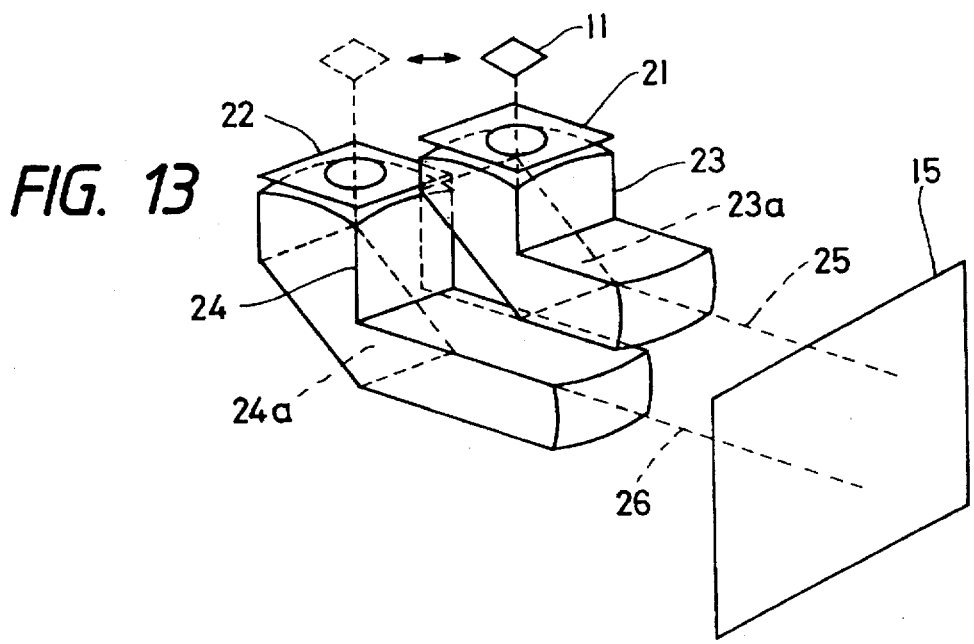
FIG. 13 shows a perspective view illustrating a configuration of a seventh embodiment of the present invention.
Figure 14A:
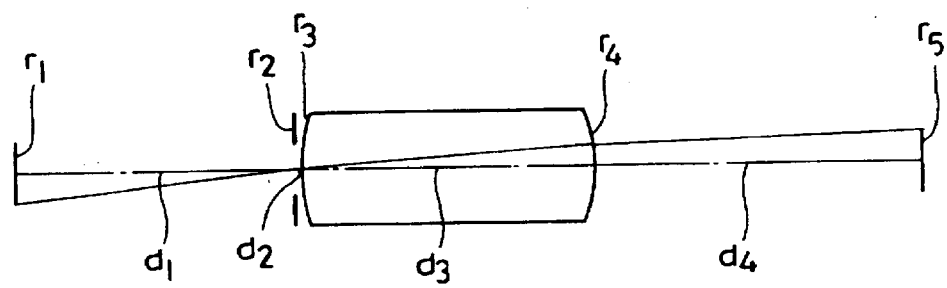
FIG. 14A and FIG. 14B show development views illustrating an optical system to be used in the seventh embodiment of the present invention.
Figure 14B:
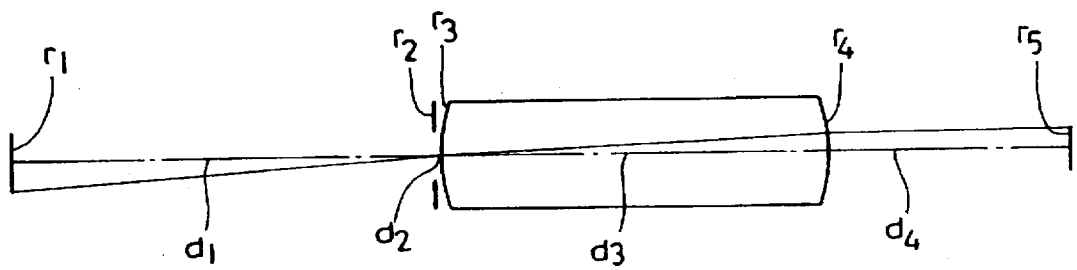

FIG. 13 shows a perspective view descriptive of a concept adopted for a seventh embodiment of the photographing apparatus according to the present invention which uses an optical system shown in FIG. 14A and FIG. 14B in developed conditions thereof. In FIG. 13, reference numeral 11 represents a display member, reference numerals 21 and 22 designate aperture stops, reference numerals 23 and 24 denote imaging lens systems, reference numeral 15 represents a film, reference numerals 25 and 26 designate optical axes, and reference numerals 23a and 24a denote reflecting surfaces.

The seventh embodiment is free from eccentricity since the optical axes of the imaging lens systems 23 and 24 are coincident with center axes of the optical system used in this embodiment. Two imaging lens systems 23 and 24 are disposed in a direction along the thickness of a camera body. In other words, the imaging lens system 23 and the imaging lens system 24 are disposed so that one is placed on the other in a vertical direction. In the seventh embodiment also, the imaging lens systems 23 and the imaging lens system 24 may be molded integrally so as to have the reflecting surfaces 23a and 24a as well as portions rising above the reflecting surfaces and other portions extending from the reflecting surfaces toward the film surface. The rising portion and the extending portion of the imaging lens system 23 are shorter than those of the imaging system 24. Further, a distance as measured from the film to a surface of emergence of the imaging lens system 23 is longer than a distance as measured from the film to a surface of emergence of the imaging lens system 24. The optical axes of these two imaging lens system are nearly parallel with each other like the case of the sixth embodiment of the present invention. The seventh embodiment is configured so as to perform switching of the photographing modes by moving the display member 11. Accordingly, characters and other data are moved in a direction along a shorter side of the film in conjunction with the movement of the display section 11. When two display members are prepared, the photographing modes can be switched by selectively glowing the display members.

The seventh embodiment has numerical data which are listed below:

Embodiment 7

(first mode)
magnification = $-1.0$, IO = 30 mm
effective F number = 8.0
$r_1$ = display member
   $d_1 = 9.15$
$r_2 = \infty$ (stop)
   $d_2 = 0.20$
$r_3 = 6.031$
   $d_3 = 9.73$    $n_1 = 1.48993$    $v_1 = 57.66$
$r_4 = -4.313$ (aspherical surface)
   $d_4 = 10.92$
$r_5$ = film surface
aspherical surface coefficients
(4th surface)
$P = 0.4979$, $A_4 = 1.4033 \times 10^{-3}$
$A_6 = -4.5822 \times 10^{-4}$, $A_8 = 1.9361 \times 10^{-4}$
(second mode)
magnification = $-0.7$, IO = 35 mm
effective F number = 5.7
$r_1$ = display member
   $d_1 = 13.90$
$r_2 = \infty$ (stop)
   $d_2 = 0.20$
$r_3 = 5.245$
   $d_3 = 12.96$    $n_1 = 1.48993$    $v_1 = 57.66$
$r_4 = -4.999$ (aspherical surface)
   $d_4 = 7.94$
$r_5$ = film surface
aspherical surface coefficients
(4th surface)
$P = -0.1002$, $A_4 = 1.5806 \times 10^{-3}$
$A_6 = -7.7505 \times 10^{-4}$, $A_8 = 4.2236 \times 10^{-4}$ In the first mode of the seventh embodiment, a distance as measured from the display member to the film surface is kept at 30 mm, an imaging magnification is set at $-1.0\times$ and the optical system has an effective F number of 8.0. In the second mode, the distance as measured from the display member to the film surface is changed to 35 mm, the imaging magnification is modified to $-0.7\times$ and the optical system has an effective F number of 5.7 since the aperture stops 21 and 22 have the same size.

Each of the imaging lens systems 23 and 24 is formed of a single biconvex lens component as shown in FIG. 14A and FIG. 14B, and has an aspherical surface on a side of emergence therefrom. The imaging lens systems 23 and 24 are members which are quite different from each other.

Figure 15:
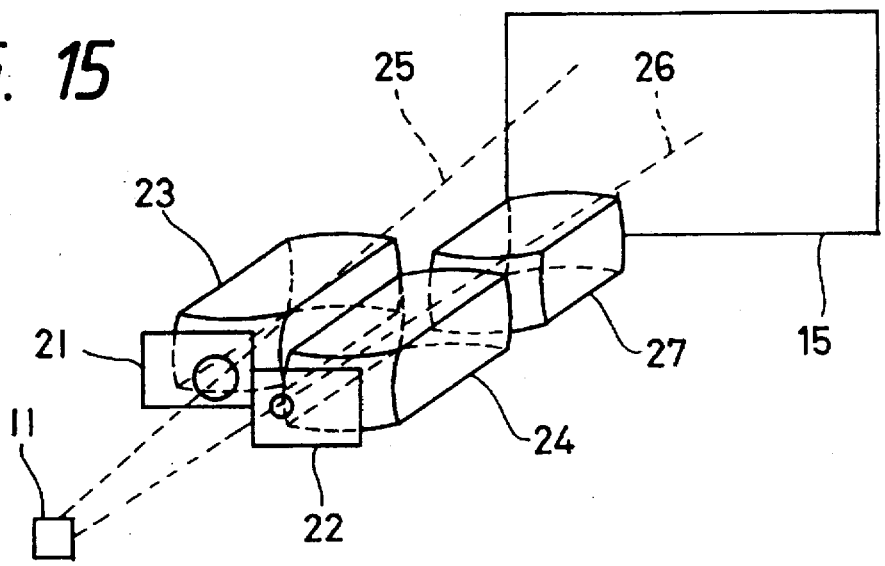
FIG. 15 shows a perspective view illustrating a configuration of an eighth embodiment of the present invention.
Figure 16A:
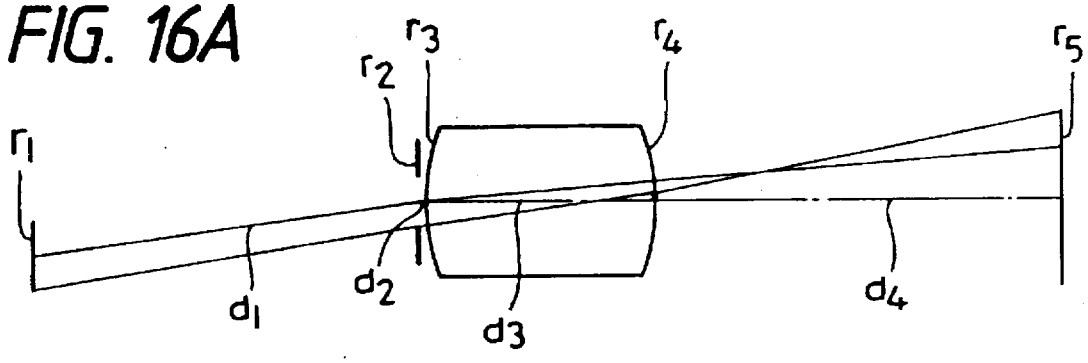
FIG. 16A and FIG. 16B show development views illustrating an optical system to be used in the eighth embodiment of the present invention.
Figure 16B:
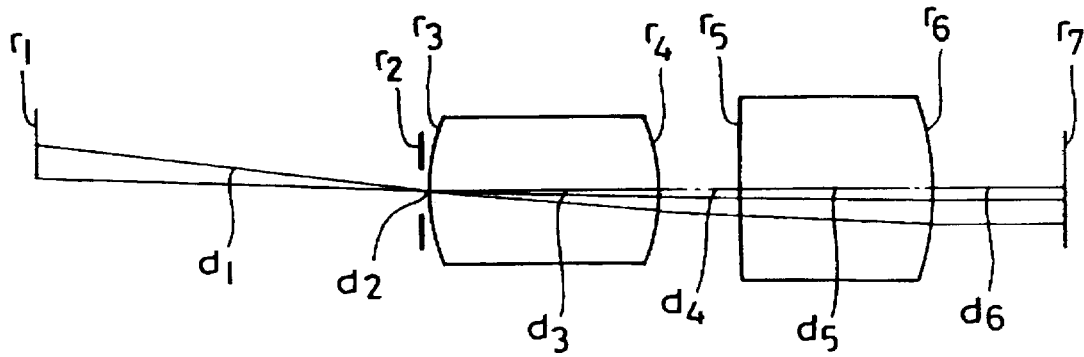

FIG. 15 shows a perspective view illustrating a concept adopted for an eighth embodiment of the present invention which uses an optical system shown in developed conditions in FIG. 16A and FIG. 16B. In these drawings, reference numeral 11 represents a display member, reference numerals 21 and 22 designate aperture stops, reference numerals 23 and 24 denote imaging lens systems, reference numeral 15 represents a film, reference numerals 25 and 26 designate optical axes, and reference numeral 27 denote an auxiliary lens unit.

In the eighth embodiment, the aperture stop 22 which is to be used in a second mode has an aperture smaller than that of the aperture stop 21 which is to be used in a first mode so that the optical system has an F number which remains unchanged between the first mode and the second mode. This optical system is eccentric like that used in the sixth embodiment of the present invention.

In the first mode of the eighth embodiment, a light bundle emitted from the display member 11 is allowed to pass through the aperture stop 21, falls on the imaging lens system 23, emerges from the imaging lens system 23 and is imaged onto the film 15. In the second mode, on the other hand, the light bundle is allowed to pass through the auxiliary lens unit 27 after emerging from the imaging lens system 24 and is imaged onto the film 15.

The eighth embodiment, which uses no reflecting surface, is configured so as to image straightly the display member 11 disposed before the film 15. Further, the eighth embodiment uses the display member 11 commonly between the first mode and the second mode while it is kept fixed. The optical axis 25 is 3 mm apart from the optical axis 26.

The optical system adopted for the eighth embodiment has the following numerical data:

---

Embodiment 8

(first mode)
magnigication = –1.0, IO = 30 mm
effective F number = 8.0
$r_1$ = display member
$\quad d_1 = 11.32$
$r_2 = \infty$ (stop)
$\quad d_2 = 0.20$
$r_3 = 6.050$
$\quad d_3 = 6.66 \quad n_1 = 1.48993 \quad v_1 = 57.66$
$r_4 = -5.427$ (aspherical surface)
$\quad d_4 = 11.82$
$r_5$ = film surface
aspherical surface coefficients
(4th surface)
$\quad P = 0.5512, A_4 = 1.7587 \times 10^{-3}$
$\quad A_6 = -2.1356 \times 10^{-4}, A_8 = 4.5908 \times 10^{-5}$
(second mode)
magnification = –0.7, IO = 30 mm
effective F number = 8.0
$r_1$ = display member
$\quad d_1 = 11.32$
$r_2 = \infty$ (stop)
$\quad d_2 = 0.20$
$r_3 = 6.050$
$\quad d_3 = 6.66 \quad n_1 = 1.48993 \quad v_1 = 57.66$
$r_4 = -5.427$ (aspherical surface)
$\quad d_4 = 2.31$
$r_5 = 86.785$
$\quad d_5 = 5.65 \quad n_1 = 1.48993 \quad v_2 = 57.66$
$r_6 = -7.207$ (aspherical surface)
$\quad d_6 = 3.86$
$r_7$ = film surface
aspherical surface coefficients
(4th surface)
$\quad P = 0.5512, A_4 = 1.7587 \times 10^{-3}$
$\quad A_6 = -2.1356 \times 10^{-4}, A_8 = 4.5908 \times 10^{-5}$
(6th surface)
$\quad P = 0.9559, A_4 = 8.8525 \times 10^{-4}$
$\quad A_6 = -3.4920 \times 10^{-4}, A_8 = 5.7362 \times 10^{-5}$

---

In the first mode of the eighth embodiment, a distance as measured from the display member to a surface of the film is kept at 30 mm, an imaging magnification is set at –1.0× and the optical system has an effective F number of 8.0, as in the case of sixth embodiment. In the second mode of eighth embodiment, the distance as measured from the display member to the film surface is kept at 30 mm, the imaging magnification is changed to 0.7× and the effective F number of the optical system remains unchanged from 8.0. Further, each of the imaging lens systems and the auxiliary lens unit is composed of a single biconvex lens component which has an aspherical surface on the side of emergence therefrom. Furthermore, the imaging lens system 23 is quite the same as the imaging lens system 24.

Figure 17:
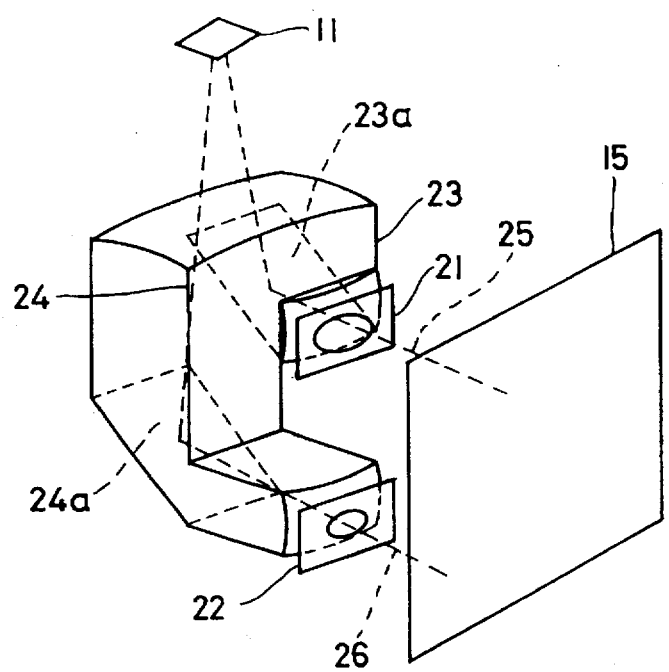
FIG. 17 show a perspective view illustrating a configuration of a ninth embodiment of the present invention.
Figure 18A:
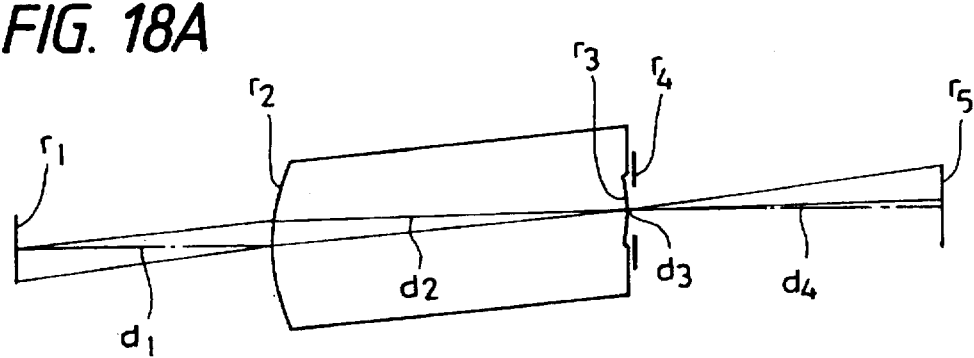
FIG. 18A and FIG. 18B show development views illustrating an optical system to be used in the ninth embodiment of the present invention.
Figure 18B:
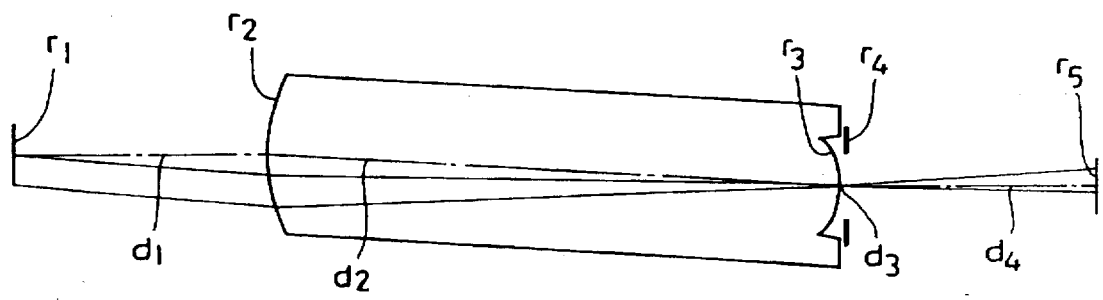

FIG. 17 shows a perspective view illustrating a concept adopted for configuring a ninth embodiment of the represent invention which uses an optical system illustrated in developed conditions in FIG. 18A and FIG. 18B. In FIG. 17, reference numeral 11 represents a display member, reference numerals 21 and 22 designate aperture stops, reference numerals 23 and 24 denote imaging lens systems, reference numeral 15 represents a film, reference numerals 25 and 26 designate optical axes, and reference numerals 23a and 24a denote reflection surfaces.

In the ninth embodiment, the imaging lens system 23 which is to be used in a first mode has a surface of emergence formed as a side surface thereof and the imaging lens system 24, which is to be used in a second mode, has a surface of emergence formed at a location protruding from a side surface thereof so that a distance as measured from a surface of the film 15 to the surface of emergence of the imaging lens system 23 is longer than a distance as measured from the film surface 15 to the surface of emergence of the imaging lens system 24. Further, the aperture stops are disposed on the emergence sides of the surfaces of emergence of the imaging lens systems and an aperture to be used in the first mode is larger than an aperture to be used in the second mode.

The optical system adopted for the ninth embodiment has numerical data listed below:

---

Embodiment 9

(first mode)
magnificaiton = –1.0, IO = 30 mm
effective F number = 8.0
$r_1$ = display member
$\quad d_1 = 8.04$
$r_2 = 5.599$ (aspherical surface)
$\quad d_2 = 11.61 \quad n_1 = 1.48993 \quad v_1 = 57.66$
$r_3 = -3.911$ (aspherical surface)
$\quad d_3 = 0.20$
$r_4 = \infty$ (stop)
$\quad d_4 = 10.15$
$r_5$ = film surface
aspherical surface coefficients
(2nd surface)
$\quad P = 0.0411, A_4 = -2.7233 \times 10^{-4}$
$\quad A_6 = -5.0896 \times 10^{-5}, A_8 = 0$
(3rd surface)
$\quad P = 10.9741, A_4 = 4.0725 \times 10^{-2}$
$\quad A_6 = -7.3907 \times 10^{-3}, A_8 = 0$
(second Mode)
magnification = –0.7, IO = 35 mm
effective F number = 8.0
$r_1$ = display member
$\quad d_1 = 8.04$
$r_2 = 5.599$ (aspherical surface)
$\quad d_2 = 18.72 \quad n_1 = 1.48993 \quad v_1 = 57.66$
$r_3 = -3.343$ (aspherical surfce)
$\quad d_3 = 0.20$
$r_4 = \infty$ (stop)
$\quad d_4 = 8.04$
$r_5$ = film surface
aspherical surface coefficients
(2nd surface)
$\quad P = 0.0411, A_4 = -2.7233 \times 10^{-4}$
$\quad A_6 = -5.0896 \times 10^{-5}, A_8 = 0$
(3rd surface)
$\quad P = 3.9617, A_4 = 3.2994 \times 10^{-2}$
$\quad A_6 = -2.7123 \times 10^{-2}, A_8 = 0$

---

In the first mode of the ninth embodiment, a distance as measured from the display member to the film surface is kept at 30 mm, an imaging magnification is set at −1.0× and the optical system has an effective F number of 8.0. In the second mode, the distance as measured from the display member to the film surface is modified to 35 mm, the imaging magnification is changed to −0.7× and the effective F number of the optical system is kept at 8.0. Further, each of the imaging lens systems is composed of a single biconvex lens component as shown in FIG. 18A and FIG. 18B, and has aspherical surfaces on both sides thereof. Surfaces of incidence of these two imaging lens systems are formed as a single surface as illustrated in FIG. 17, and each of optical axes 25 and 26 of the imaging lens systems is eccentric from the surface of incidence.

Figure 19:
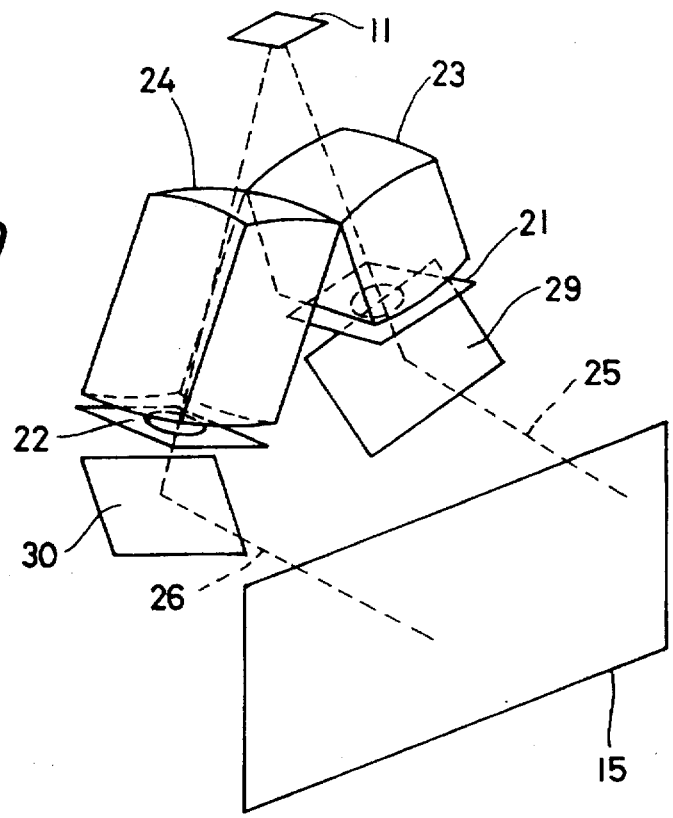
FIG. 19 shows a perspective view illustrating a configuration of a tenth embodiment of the present invention.
Figure 20A:
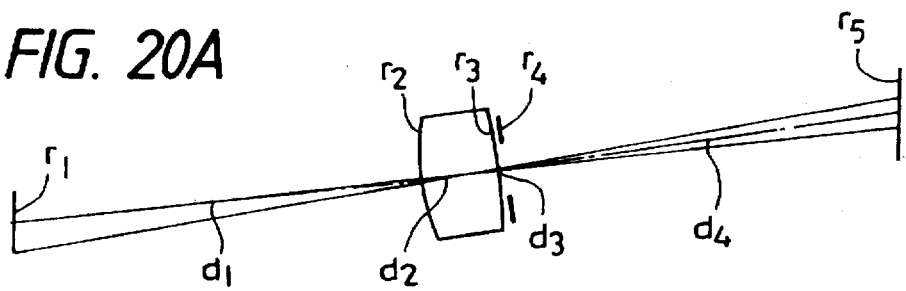
FIG. 20A and FIG. 20B show development views illustrating an optical system to be used in the tenth embodiment of the present invention.
Figure 20B:
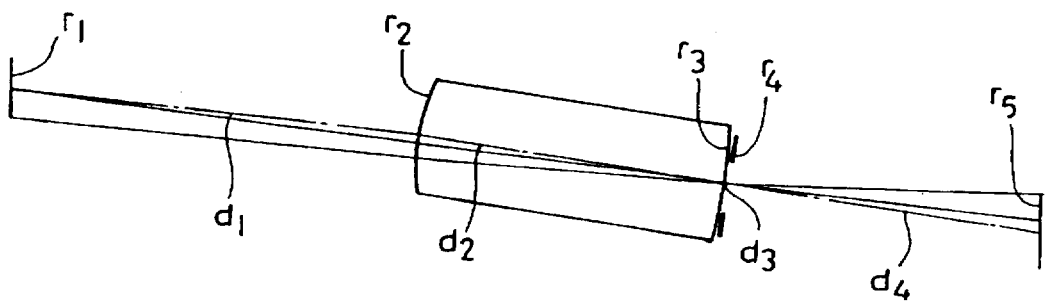

FIG. 19 is a perspective view showing a concept selected for a tenth embodiment of the present invention which uses an optical system illustrated in developed conditions in FIG. 20A and FIG. 20B. In these drawings, reference numeral 11 represents a display member, reference numerals 21 and 22 designate aperture stop, reference numerals 23 and 24 denote imaging lens systems, reference numeral 15 represents a film, reference numerals 25 and 26 designate optical axes, and reference numerals 29 and 30 denote reflecting surfaces.

In the tenth embodiment, the two imaging lens systems each of which is composed of a thick prism-shaped lens component are disposed so as to have inclined optical axes, the aperture stops 21 and 22 are disposed on the emergence sides of surfaces of emergence of the imaging lens systems, and the reflecting surfaces are placed on the emergence sides of the aperture stops for leading rays to a surface of the film 15.

In the tenth embodiment, surfaces of incidence of the imaging lens system 23 and 24 have the same shape and are disposed at an equal distance as measured from the display member. Further, the optical axes of the two imaging lens systems intersect with each other at an angle of 17° though these optical axes are coincident with center axes of the optical system.

The optical system used in the tenth embodiment has numerical data which are listed below:

---

Embodiment 10

(first mode)
  magnification = −1.0, IO = 30 mm
  effective F number = 8.0
$r_1$ = display member
    $d_1$ = 13.69
$r_2$ = 6.510 (aspherical surface)
    $d_2$ = 2.60     $n_1$ = 1.48993     $v_1$ = 57.66
$r_3$ = −6.964 (aspherical surface)
    $d_3$ = 0.20
$r_4$ = ∞ (stop)
    $d_4$ = 13.51
$r_5$ = film surface
aspherical surface coefficients
(2nd surface)
    P = 1.0525, $A_4$ = −3.9126 × $10^{-4}$
    $A_6$ = 0, $A_8$ = 0
(3rd surface)
    P = 6.0086, $A_4$ = 1.0003 × $10^{-2}$
    $A_6$ = −1.9925 × $10^{-2}$, $A_8$ = 1.4302 × $10^{-2}$
(second mode)
  magnification = −0.8, IO = 35 mm
  effective F number = 8.0
$r_1$ = display member
    $d_1$ = 13.69
$r_2$ = 6.510 (aspherical surface)
    $d_2$ = 10.50    $n_1$ = 1.48993     $v_1$ = 57.66
$r_3$ = −5.451 (aspherical surface)
    $d_3$ = 0.20

---continued

Embodiment 10

$r_4$ = ∞ (stop)
    $d_4$ = 10.61
$r_5$ = film surface
aspherical surface coefficients
(2nd surface)
    P = 1.0525, $A_4$ = −3.9126 × $10^{-4}$
    $A_6$ = 0, $A_8$ = 0
(3rd surface)
    P = 5.9204, $A_4$ = 1.3579 × $10^{-2}$
    $A_6$ = −4.0463 × $10^{-2}$, $A_8$ = 4.9450 × $10^{-2}$

---

In the first mode of the tenth embodiment, a distance as measured from the display member to a surface of the film surface is kept at 30 mm, an imaging magnification is set at −1.0× and the optical system has an effective F number of 8.0. In the second mode, the distance as measured from the display member to the film surface is modified to 35 mm, the imaging magnification is changed to −0.8× and the F number of the optical system is kept at 8.0.

In the tenth embodiment, each of the imaging lens systems is composed of a single biconvex lens component having aspherical surfaces on both sides thereof.

Though each of the embodiments of the present invention is configured so as to have a magnification which is enhanced by switching from a first mode to a second mode, it is possible to configure the embodiment so as to have a magnification which is lowered by switching from the first mode to the second mode.

The aspherical surfaces used in the embodiments described above have shapes which is expressed by the following formula:

$$z = \frac{Y^2/r}{1 + \sqrt{1 - p(Y/r)^2}} + A_4 Y^4 + A_6 Y^6 + A_8 Y^8$$

wherein the z axis is taken as a direction in which rays travel along an optical axis, the y axis is taken as a direction perpendicular to the optical axis, the reference symbol r represents a paraxial radius of curvature, and the reference symbols p, $A_4$, $A_6$ and $A_8$ designate aspherical surface coefficients.

In the numerical data of the embodiments of the present invention, the reference symbols $r_1$, $r_2$, ... represent radii of curvature on respective lens surfaces, the reference symbols $d_1$, $d_2$, ... designate airspaces reserved between the respective lens surfaces, the reference symbol n denotes a refractive index of a lens component at a wavelength of 655 nm, and the reference symbol v represents an Abbe's number for the d-line. Though the lens components used in all the embodiments are made of acrylic resin materials which are apt to be influenced by variations of temperature and humidity, it is possible to make the lens components of low hygroscopic materials for preventing influences due to variations of humidity.

The first mode and the second mode of each of the embodiments are illustrated separately. The display members 11 are used commonly between the first modes and the second modes, though they are traced at locations which are different from each other between FIG. 8A, FIG. 10A illustrating the first modes, and FIG. 8B, FIG. 10B illustrating the second modes among the development views of the optical systems used in the third embodiment and the fourth embodiment. The locations of the film surfaces are kept fixed as shown in FIG. 13, FIG. 17 and FIG. 19, though the locations are traced differently between FIG. 12A, FIG.

14A, FIG. 18A, FIG. 20A illustrating the first modes of the sixth, seventh, ninth and tenth embodiments, and FIG. 12B, FIG. 14B, FIG. 18B and FIG. 20B illustrating the second modes thereof. LED's or illuminated LCD's are usable as display members in the optical systems according to the present invention. Further, optical paths are made of plastic materials.

The data recording optical system according to the present invention is capable of recording characters and other data without fail in natural sizes and at natural locations regardless of variations of film sizes.

We claim:

1. A photographing apparatus, comprising:

a photographing lens system;

an image receiving means for receiving images formed by said photographic lens system;

a data display means for providing data different from said images; and a plurality of imaging lens systems which form optical paths for projecting rays from said data display means to said image receiving means;

wherein aperture stops are disposed in the optical paths formed in said plurality of imaging lens systems, respectively, wherein each of said imaging lens systems has at least one aspherical surface, wherein said photographing apparatus is equipped with an optical path switching means for leading rays from said data display means selectively into said optical paths and wherein the data provided by said data display means is projected to different locations or said image receiving means at different magnifications when the optional paths are switched from one to another by said optical path switching means.

2. A photographing apparatus according to claim 1, wherein shutters are disposed on a side of incidence or emergence of said imaging lens systems, and rays from said data display means are allowed to be incident selectively on said imaging lens systems by opening and closing said shutters.

3. A photographing apparatus according to claim 1 wherein said data display means is displaceable relative to said imaging lens systems so that rays from said data display means are allowed to be selectively incident on said plurality of imaging lens systems by moving said data display means.

4. A photographing apparatus according to claim 1 wherein said data display means comprises a plurality of displays, one of each of which is disposed in one of a plurality of optical paths formed by said imaging lens systems, respectively, wherein said optical path switching means functions to cause at least one of said plurality of said displays to illuminate thereby providing said data.

5. A photographing apparatus according to claim 1, wherein said optical system has a reflecting surface.

6. A photographing apparatus according to claim 1, wherein each of said imaging lens systems is composed of a single lens element.

7. A photographing apparatus according to claim 1, wherein each of said imaging lens systems has a reflecting surface.

8. A photographing apparatus according to claim 1, wherein each of said imaging lens systems is configured as a prism.

9. A photographing apparatus according to claim 1, wherein each of said imaging lens systems has an aspherical surface on the side of emergence therefrom.

10. A photographing apparatus according to claim 1, wherein said plurality of imaging lens systems are integrally molded.

11. A photographing apparatus according to claim 1, wherein said plurality of imaging lens systems are configured so as to have a common surface of incidence.

12. A photographing apparatus according to claim 1, wherein said plurality of imaging lens systems are configured so as to have the same surface of incidence.

13. A photographing apparatus according to claim 1, wherein said plurality of imaging lens systems are disposed so as to have surfaces of incidence which are disposed adjacent one another.

14. A photographing apparatus having a plurality of photographing modes in which image areas are different from one another, comprising:

data display means for providing data; and an imaging lens system for imaging said data provided by said data display means onto an image receiving means for photographing images of objects;

wherein said imaging lens system comprises:
      a main lens unit, and
      an auxiliary lens unit, wherein said main lens unit is moved in conjunction with switching of the photographing modes of said photographing apparatus, wherein said auxiliary lens unit is disposed so as to be settable and removable into and out of an optical path leading from said data display means through said main lens unit to said image receiving means, wherein locations and/or sizes of images of said data to be formed on said image receiving means are changed by moving said main lens unit and setting or removing said auxiliary lens unit, and wherein said imaging lens unit has at least one aspherical surface which has a shape such that a positive power thereof becomes weaker (a negative power thereof becomes stronger) as the distance from said optical axis becomes longer.

* * * * *